(12) United States Patent
Matsuzaki et al.

(10) Patent No.: US 9,540,176 B2
(45) Date of Patent: Jan. 10, 2017

(54) CONVEYOR DEVICE FOR CONVEYING FOOD

(71) Applicant: MAYEKAWA MFG. CO., LTD., Tokyo (JP)

(72) Inventors: Tomohiko Matsuzaki, Tokyo (JP); Kou Ishikura, Tokyo (JP); Takeshi Chimura, Tokyo (JP); Shuichi Fujita, Tokyo (JP); Takayuki Kishi, Tokyo (JP); Akira Sekino, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 14/758,075

(22) PCT Filed: Dec. 19, 2013

(86) PCT No.: PCT/JP2013/084129
§ 371 (c)(1),
(2) Date: Jun. 26, 2015

(87) PCT Pub. No.: WO2014/103887
PCT Pub. Date: Jul. 3, 2014

(65) Prior Publication Data
US 2015/0353285 A1    Dec. 10, 2015

(30) Foreign Application Priority Data

Dec. 27, 2012   (JP) .................. 2012-286312
Dec. 27, 2012   (JP) .................. 2012-286313

(51) Int. Cl.
*B65G 27/02*     (2006.01)
*B65G 17/06*     (2006.01)
(Continued)

(52) U.S. Cl.
CPC ........... *B65G 17/063* (2013.01); *B65G 17/086* (2013.01); *B65G 21/18* (2013.01); *B65G 21/2045* (2013.01); *B65G 23/06* (2013.01); *B65G 23/44* (2013.01)

(58) Field of Classification Search
CPC .................... B65G 2207/24; B65G 17/064
(Continued)

(56) References Cited

U.S. PATENT DOCUMENTS 3,809,207 A    5/1974   Euverard
5,243,962 A *  9/1993   Hwang .................. A21B 1/26
                                                  126/21 A
(Continued)

FOREIGN PATENT DOCUMENTS

JP          6445612 U    3/1989
JP          06100133 A * 4/1994
(Continued)

OTHER PUBLICATIONS

Japanese Office Action issued in counterpart application No. JP2014-554387, dated Dec. 18, 2015. English translation provided.
(Continued)

*Primary Examiner* — Timothy Waggoner
*Assistant Examiner* — Lester Rushin
(74) *Attorney, Agent, or Firm* — Rossi, Kimms & McDowell LLP

(57) ABSTRACT

A conveyor device for food includes bar members coupled with coupling members to form a conveyor belt. A guide rail supports the belt, and a sprocket meshes with tooth-shaped portions formed on the coupling members. Each coupling members includes a metallic insert member. A wear resistant resin member incorporating the metallic insert member has a bent shape with an interior space(s), both end portions coupled to a first bar member, and a pair of slotted holes in which a second bar member which is adjacent to the first bar member is loosely fitted. Wear resistant resin members form tooth-shaped portions and slide surfaces which slide on the guide rail. Meshing portion of the sprocket which meshes with the tooth-shaped portions is formed of wear resistant (Continued)

resin. Contact pressure and friction in a slide portion between the belt and the slide portion is prevented from increasing in low temperature environments.

10 Claims, 14 Drawing Sheets

(51) Int. Cl.
    *B65G 21/20*     (2006.01)
    *B65G 23/44*     (2006.01)
    *B65G 17/08*     (2006.01)
    *B65G 21/18*     (2006.01)
    *B65G 23/06*     (2006.01)

(58) Field of Classification Search
    USPC .......................................................... 198/778
    See application file for complete search history.

(56) References Cited

U.S. PATENT DOCUMENTS

| | | |
|---|---|---|
| 7,721,877 B2 | 5/2010 | Maine, Jr. et al. |
| 2007/0119692 A1* | 5/2007 | Menke ................... B65G 17/06 198/853 |
| 2008/0017483 A1 | 1/2008 | Lago |
| 2010/0282577 A1 | 11/2010 | Rettore et al. |
| 2013/0213773 A1* | 8/2013 | Talsma ................. B65G 17/086 198/778 |

FOREIGN PATENT DOCUMENTS

| | | |
|---|---|---|
| JP | 1035846 A | 2/1998 |
| JP | 10157820 A | 6/1998 |
| JP | 2002505243 A | 2/2002 |
| JP | 3123226 U | 7/2006 |
| JP | 2007169059 A | 7/2007 |
| JP | 2008056489 A | 3/2008 |
| WO | 9944921 A1 | 9/1999 |

OTHER PUBLICATIONS

International Preliminary Report on Patentability issued in PCT/JP2013/084129, mailed Jul. 9, 2015. English translation provided.
Written Opinion issued in PCT/JP2013/084129, mailed Apr. 1, 2014. English translation provided.
International Search Report issued in PCT/JP2013/084129, mailed Apr. 1, 2014. English translation provided.

\* cited by examiner cross-sectional view along line A-A

CONVEYOR DEVICE FOR CONVEYING FOOD

TECHNICAL FIELD

The present invention relates to a conveyor device for conveying food which can be applied to food processing in a closed space and more particularly can be applied to processing such as cooling, freezing, heating, and drying.

BACKGROUND

Conventionally, a configuration has been employed in which a spiral endless conveyor is disposed in a freezer and freezing processing is executed on food and the like being conveyed by the spiral endless conveyor, as a configuration of executing processing such as heating, drying, and freezing on food. The spiral endless conveyor provides an advantage of achieving a smaller conveyor installation area and achieving labor saving by reducing an operation of putting and taking a product to be frozen into and out of the freezer. Patent Document 1 discloses an example of such a conveyor device which is schematically described below with reference to FIG. 21.

In FIG. 21, a spiral endless conveyor device 200 has a spiral endless conveyor belt 204 disposed in a vertical direction in an area surrounded by a plurality of columns 202. An electric motor 206 is disposed in an area around an inlet of the spiral endless conveyor 204 and an auxiliary transmission device 208 is disposed in an interior area of the spiral endless conveyor belt 204. The electric motor 206 drivingly rotates the auxiliary transmission device 208 via a gear 210. A plurality of columns 212, forming the auxiliary transmission device 208, rotate to apply moving force to the spiral endless conveyor belt 204.

The spiral endless conveyor belt 204 includes an inlet path 204A, a spiral ascending path 204B disposed in an interior area of the columns 202, a turning back path 204C disposed at the upper most portion, a spiral descending path 204D, and an outlet path 204E. The upper most portion of the spiral ascending path 204B is connected to the upper most portion of the spiral descending path 204D via the turning back path 204C. The turning back path 204C does not involve reversing of the conveyance surface, and turns back with the same conveyance surface always facing upward. The spiral ascending path 204B and the spiral descending path 204D are alternately arranged in the vertical direction and move in opposite directions.

Patent Document 2 and Patent Document 3 disclose a configuration of a conveyor belt forming a conveyor device. In FIG. 6 in Patent Document 2, a configuration is disclosed which includes tooth-shaped portions, of an involute form, arranged at an equal interval at an outer side portion of the conveyor belt and a toothed wheel which meshes with the tooth-shaped portions, and which drives the conveyor belt with the toothed wheel.

Patent Document 3 discloses a configuration in which supported portions, with a U-shaped cross section opening in the horizontal direction, are disposed at both side portions of the conveyor belt and a guide rail loosely fitted to the supported portions is provided, and the guide rail movably supports the conveyor belt. Patent Document 2 and 3 disclose a configuration in which an anti-drop plate, which prevents a conveyed product from dropping, protrudes upward from a conveyor belt conveyance surface and is fixedly fitted to two adjacent bars forming the conveyor belt.

CITATION LIST

Patent Literature

Patent Document 1: Japanese Patent Application Laid-open No. 2007-169059
Patent Document 2: Japanese Patent Application Laid-open No. 2008-56489 (FIG. 6)
Patent Document 3: Japanese Utility Model No. 3123226

SUMMARY

Technical Problem

Generally, the tooth-shaped portions and the tooth-wheel which meshes with the tooth-shaped portions, disclosed in Patent Document 2, are formed of metal such as stainless steel. Thus, metal powder, produced by friction at the meshing portion, might adversely affect the quality of a conveyed product such as food. The supported portions having the U-shaped cross section disclosed in Patent Document 3 have the following problems. Specifically, in a low temperature environment such as a freezer, the guide rail might protrude inward from each of the supported portions due to the difference between a material of the supported portion and a material of the guide rail supporting the supported portion in a linear expansion coefficient.

Furthermore, there is a problem that driving torque increases due to high contact pressure between the supported portion and the guide rail attributable to the difference between the supported portion and the guide rail in the linear expansion coefficient and wearing of a slide surface between the supported portion and the guide rail increases. Furthermore, there is a problem that, because the guide rail is inserted in the supported portion having the U-shaped cross section, it is difficult to remove slackening of the conveyor belt.

The anti-drop plate disclosed in Patent Documents 2 and 3 is a single anti-drop plate fixedly fitted to the two bars forming the conveyor belt. Thus, the relative position between the adjacent bars is restricted. As a result, there is a problem that an intricate curved line shape of the conveyor belt cannot be formed at a curved portion of the conveyor belt. Furthermore, there is a problem that the anti-drop plate has fixedly fitted portions for the two bars formed, and thus has a complicated structure and requires a high manufacturing cost.

Thus, in view of the problems of the conventional techniques, an object of the present invention is to prevent the production of the metal powder, and prevent the contact pressure and wearing from increasing at the slide portion between the conveyor belt and the guide rail in the low temperature environment. A furthermore object is to enable the slackening of the conveyor belt to be easily fixed, achieve higher design freedom of the conveyor belt by enabling the intricate curved line shape to be formed at the curved portion of the conveyor belt, and simplify the structure of the anti-drop plate.

Solution to Problem

The present invention is applied to a conveyor device for conveying food which processes food while conveying the food with a spiral conveyor belt disposed in a vertical direction in a closed space and includes a large number of bar members which are arranged in parallel to form the conveyor belt, coupling members which are fixed to both ends of each of the bar members and couple the bar members with each other, a guide rail which slidably supports the conveyor belt including the bar members, and a sprocket which meshes with tooth-shaped portions formed on the coupling members.

To achieve the object, in the conveyor device for conveying food according to the present invention, each of the coupling members includes a metallic insert member and a wear resistant resin member incorporating the metallic insert member, has a bent shape with an interior space, has both end portions coupled to a first bar member, and has a pair of slotted holes in which a second bar member which is adjacent to the first bar member is loosely fitted. In addition, the wear resistant resin members form the tooth-shaped portions and slide surfaces which slide on the guide rail, and a meshing portion of the sprocket which meshes with the tooth-shaped portions is formed of a wear resistant resin.

In this configuration, the guide rail supports the conveyor belt from below. Each of the coupling members provided to both ends of each both ends of the bar members restricts the two adjacent bar members. Thus, the conveyor belt in which the multiple bar members are disposed at positions parallel to each other can be formed. On the other hand, the coupling members are coupled in series along the conveyance path via the bar members. The second bar member can move in the conveyance direction in the slotted holes. Thus, relative displacement between the adjacent bar members in the conveyance direction can be adjusted. Curving of the conveyor belt can be achieved by changing the interval between both ends of the bar members. The sprocket applies driving force to move the coupling members in the conveyance direction, the coupling members slide on the guide rail while being supported by the guide rail, and the conveyor belt moves in the conveyance direction.

The coupling member includes the wear resistant resin member incorporating the metallic insert member. Thus, light weight can be achieved with sufficient rigidity to restrict the bar members maintained. Thus, the conveyor device as a whole can have a lighter weight. The wear resistant resin member forms the tooth-shaped portions of the coupling members, the slide surface that slides on the guide rail, and the meshing portion of the sprocket which meshes with the rollers. Thus, the wearing and the production of abrasion powder can be prevented at the slide surface and the meshing portion. Thus, the quality of the food can be prevented from being adversely affected.

The wear resistant resin used in the present invention is, for example, what is known as engineering plastic such as ultrahigh molecular polycarbonate (PC), polyamide (PA), and polyether ether ketone (PEEK), fluorocarbon resin such as Teflon (registered trademark), nylon resin, or the like.

The coupling members slide on the guide rail via the slide surface, and do not surround the rail, as in the case of the supported portion in Patent Document 3. Thus, the slackening of the conveyor belt can be easily fixed, and the contact pressure and the wearing between the guide rails do not increase in the low temperature environment.

In the present invention, the relative positions between the two adjacent bar members in the conveyance direction are note fixed, whereby the bar members can form an intricate curved line shape at a curved portion of the conveyor belt. Thus, higher design freedom for the conveyance path can be achieved. Furthermore, the slide surfaces are formed on the coupling members, and thus no special member for forming the sliding surfaces are required. Thus, the components of the conveyor belt can be simplified and can be manufactured at a low cost. The coupling member is bent in half and the first bar member is supported at two both end portions, whereby the coupling member can have higher rigidity.

In one aspect of the present invention, each metallic insert member includes a strip-shaped metal plate having a bent shape with an interior space, first and second holes in which the first bar member is inserted are respectively formed at both end portions of the metallic insert member, and a pair of slotted holes in which the first bar member is loosely fitted are formed from the both end portions toward a top portion of the metallic insert member. In this configuration, the metallic insert member with higher rigidity is disposed at a portion that comes into contact with and supports or fixes the bar member. Thus, the coupling member can have high rigidity and the bar members can be strongly supported.

In one aspect of the present invention, the tooth-shaped portions are each formed on one of the both end portions of each coupling member so as to face outward from the conveyor belt including the bar members.

Thus, the meshing with the sprockets adjacently disposed on the side of the conveyor belt can be easily achieved. Thus, the tooth-shaped portions are formed at the both end portions of the coupling members coupled to the bar members, and thus can have high rigidity.

In one aspect of the present invention, each wear resistant resin member included in the coupling members includes a guide portion protruding toward the guide rail on an outer side of the slide surface, and each guide portion includes a guide surface which is in slidable contact with a side surface of the guide rail.

As described above, the coupling member includes the guide surfaces on the outer side of the slide surface, whereby the conveyor belt can be prevented from falling off the guide rail. Also in this configuration, the coupling members is in slidable contact with the guide rail with the slide surface and the guide surfaces only, and thus do not surround the rail, as in the case of the supported member in Patent Document 3. Thus, the contact pressure and wearing between the guide rails can be prevented from increasing in the low temperature environment, and the slackening of the conveyor belt can be easily fixed.

In one aspect of the present invention, an upper edge of the guide rail is covered with a cover made of a wear resistant resin, and the cover made of the wear resistant resin is in slidable contact with the slide surfaces of the coupling members and the guide surfaces.

Thus, wearing and production of abrasion powder on the slide surface formed between the coupling member and the guide rail can be prevented, and the conveyed food can be prevented from being adversely affected by the abrasion powder.

In one aspect of the present invention, each slide surface includes a pair of slide surfaces which are disposed to be vertically symmetrical with respect to the bar members, and each guide surface includes a pair of guide surfaces which are disposed to be vertically symmetrical with respect to the bar members.

The conveyor belt forms the endless conveyor path as follows. Specifically, the endless conveyor belt is reversed at the return path to return to the conveyance start end portion. In this configuration, in the endless conveyor path, excluding the return path, the coupling members are supported by the guide rail via one of the pair of slide surfaces on the lower side, and are guided by the guide rail via one of the pair of guide surfaces on the lower side.

In the return path where the endless conveyor belt is reversed, the coupling members are supported by the guide rail via one of the pair of slide surfaces on the upper side and are guided by the guide rail via one of the pair of guide surfaces on the upper side. Thus, the conveyor belt can be stably supported by the guide rail, and can be guided without falling off the guide rail, in the return path where the conveyor belt is reversed.

In one aspect of the present invention, each coupling member has a shape such that a width of the coupling member gradually increases from the both end portions toward the top portion to have a wedge shape, and the top portion of each coupling member is configured to be capable of entering the interior space of adjacent one of the coupling members.

Thus, the top portion of one of the adjacent coupling members can easily enter the interior space of the other one of the adjacent coupling members. Thus, the first bar member and the second bar member restricted by a single coupling member can be easily displaced with respect to each other in the conveyance direction. Thus, higher design freedom can be achieved for the curved line formed by the conveyance path.

In one aspect of the present invention, each coupling member includes: a first parallel section disposed at the top portion, the first parallel section having parallel outer surfaces, and a second parallel section disposed on a portion including the both end portions and excluding the top portion, the second parallel section having parallel outer surfaces and a width larger than that of the first parallel section. The second parallel section has parallel inner surfaces and forms the interior space into which the first parallel section is able to enter.

Thus, when one of the adjacent coupling members enters the interior space of the other one of the adjacent coupling members, no gap in a longitudinal axis direction is formed between the coupling members. Thus, the coupling members can be smoothly displaced with respect to each other in the conveyance direction, whereby the conveyance operation is smoothly performed. Thus, the conveyance path can be curved easily to have higher design freedom, and the knocking phenomenon involving unstable conveyance speed at conveyance direction positions of the conveyor belt can be prevented.

In one aspect of the present invention, each metallic insert member includes a turning back portion disposed on at least one of the both end portions, the turning back portion turning back toward the top portion, and the turning back portion includes a third hole in which the first bar member is tightly fitted. Thus, the coupling members can have higher rigidity, and can be strongly coupled to the bar members.

In one aspect of the present invention, the spiral conveyor belt includes an endless conveyor belt including a return path in which the spiral conveyor belt is reversed at a terminating end portion of the spiral conveyor belt to return to a starting end portion of the spiral conveyor belt, and the guide rail is disposed over an entire length of the endless conveyor belt. The conveyor device includes a tension adjustment mechanism which is disposed in a path of the endless conveyor belt and adjusts tension of the endless conveyor belt. The conveyor device also includes a conveyance mechanism including the sprocket and a driving device for the sprocket.

Thus, the slackening of the endless conveyor belt can be adjusted by the tension adjustment mechanism. When the contact pressure and the friction force between the guide portion and the guide rail increase, knocking phenomenon involving unstable conveyance speed of the conveyor belt due to periodical change of the contact pressure and the friction force occurs. Thus, the smooth movement of the conveyor path is hindered. The present invention can prevent this knocking phenomenon.

In the return path, the conveyor belt is supported by the guide rail and thus can be prevented from slackening.

In one aspect of the present invention, the endless conveyor belt includes: an inlet path which is disposed in a horizontal direction, a spiral ascending path which has a lower end portion coupled to the inlet path and spirally ascends towards a downstream side in a conveyance direction, a turning back path turning back from an upper most portion of the spiral ascending path, a spiral descending path coupled to the turning back path and disposed so that stages of the spiral ascending path and stages of the spiral descending path are arranged alternately, the spiral descending path spirally descending, an outlet path which is coupled to a lower most portion of the spiral descending path and is disposed in the horizontal direction, and the return path which turns back at an end of the outlet path toward a lower part of the outlet path and continues to an end of the inlet path.

The spiral ascending path and the spiral descending path are disposed so that stages of the spiral ascending path and stages of the spiral descending path are arranged alternately as described above. Thus, the space saving can be achieved. Furthermore, the food is put in and taken out from a lower portion, whereby the food can be easily placed on and taken off from the spiral conveyor belt. Thus, labor saving and higher efficiency can be achieved.

Advantageous Effects

With the present invention, metal powder can be prevented from being produced on the slide surface between the components of the conveyor device, and the quality of a conveyed product can be prevented from being adversely affected.

Furthermore, the contact pressure and wearing of the slide portion between the conveyor belt and the guide rail can be prevented from increasing in a low temperature environment such as a freezer and the slackening of the conveyor belt can be easily fixed. Furthermore, an intricate curved line can be formed at a curved portion of the conveyor belt, whereby the higher design freedom can be achieved for the curved line formed by the conveyor belt.

DETAILED DESCRIPTION

Embodiments of the present invention shown in the accompanying drawings will now be described in detail. It is intended, however, that dimensions, materials, shapes, relative positions, and the like of components described in the embodiments shall be interpreted as illustrative only and not limitative of the scope of the present invention unless otherwise specified.

(First Embodiment)

Figure 1:
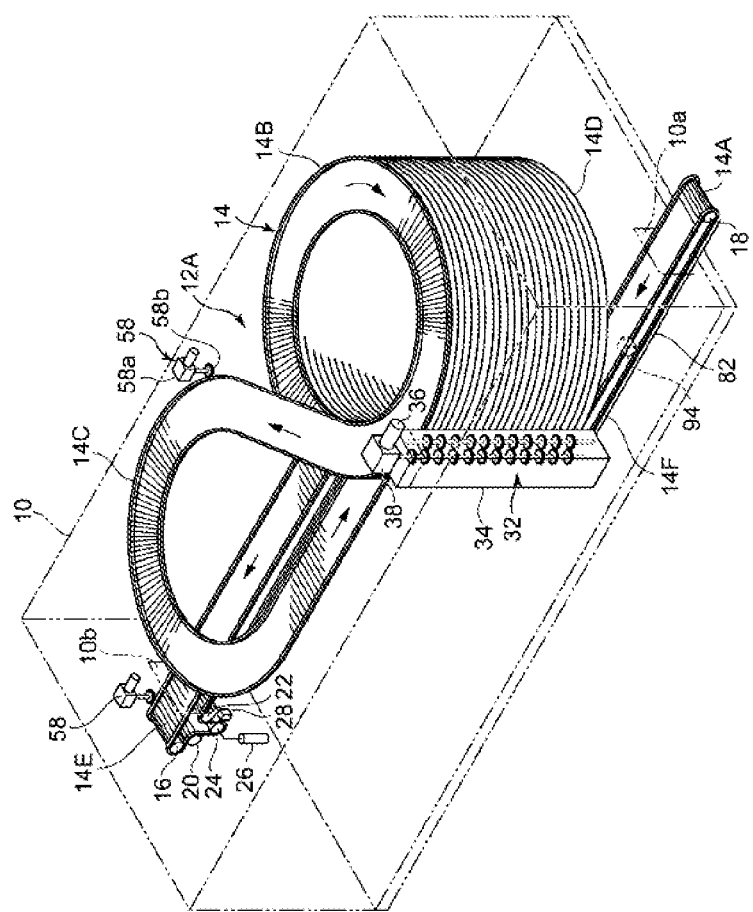
FIG. 1 is a perspective view of an entire conveyor device according to a first embodiment of the present invention.

A first embodiment of the present invention applied to a conveyor device disposed in a freezer and freezing food will be described with reference to FIG. 1 to FIG. 11. In FIG. 1, a freezer 10 having a closed structure excluding an inlet opening 10a and an outlet opening 10b is disposed, and a conveyor device 12A is disposed in the freezer 10.

An endless conveyor path 14 disposed in a conveyor device 12A includes: an inlet path 14A which enters into the freezer 10 through the inlet opening 10a; a spiral ascending path 14B spirally ascending from the inlet path 14A; a turning back path 14C turning back from the upper most portion of the spiral ascending path 14B; a spiral descending path 14D disposed so that stages of the spiral ascending path 14B and stages of the spiral descending path 14D are arranged alternately, the spiral descending path spirally descending from the turning back path 14C; an outlet path 14E extending from the lower most stage of the spiral descending path 14D to the outside of the freezer 10 through an outlet opening 10b; and a return path 14F which is reversed at an end of the outlet path 14E with a guide sprocket 16, and then is reversed again with a guide roller 18 to continue to the inlet path 14A. The spiral ascending path 14B and the spiral descending path 14D move in opposite directions. The turning back path 14C turns back with the same conveyance surface always facing upward.

Figure 2:
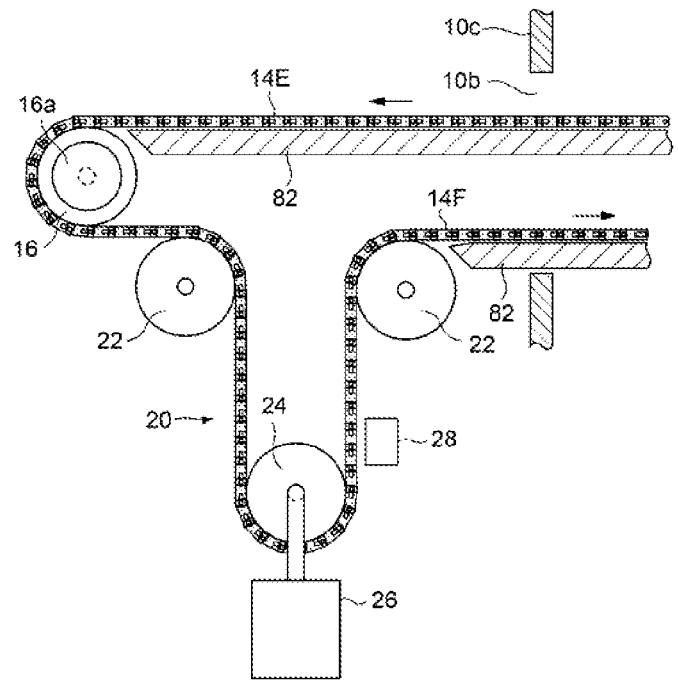
FIG. 2 is a front view showing an outlet portion of the conveyor device.

As shown in FIG. 2, a drive motor 16a is provided in the guide sprocket 16. A tension adjustment mechanism 20 for adjusting tension on the endless conveyor path 14 is disposed on an outer side of a side wall 10c of the freezer 10 on which the outlet opening 10b is formed. The tension adjustment mechanism 20 includes a pair of guide sprockets 22 and 22 and a tension roller 24 which face the return path 14F. The tension roller 24 can be moved in a vertical direction by a tension weight 26. The tension of the endless conveyor path 14 is adjusted by the movement of the tension roller 24. A tension detection sensor 28 which detects the tension of the return path 14F is disposed at an outlet side portion of the tension roller 24.

For example, the tension detection sensor 28 may be a contactless sensor or may employ a system of detecting counterforce acting on a movement device 26 of the tension roller 24 and calculating the tension of the return path 14F from the detected value. The detected value from the tension detection sensor 28 is input to a control device 30 (refer to FIG. 11).

Figure 3:
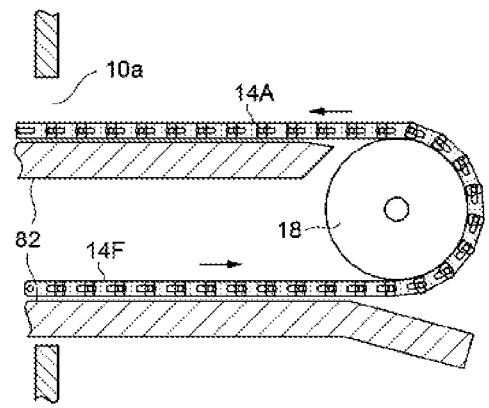
FIG. 3 is a front view showing an inlet portion of the conveyor device.

FIG. 3 shows the inlet path 14A protruding outside from the freezer 10 through the inlet opening 10a. Food is placed on the conveyor belt at the inlet path 14A.

A conveyance mechanism 32, which is disposed adjacent to the conveyor belt constituting the spiral conveyor path and moves the conveyor belt in a conveyance direction, and a housing 34, which is vertically long and incorporates the conveyance mechanism 32, stand in the freezer 10. A configuration of the conveyance mechanism 32 will be described with reference to FIG. 4.

Figure 4:
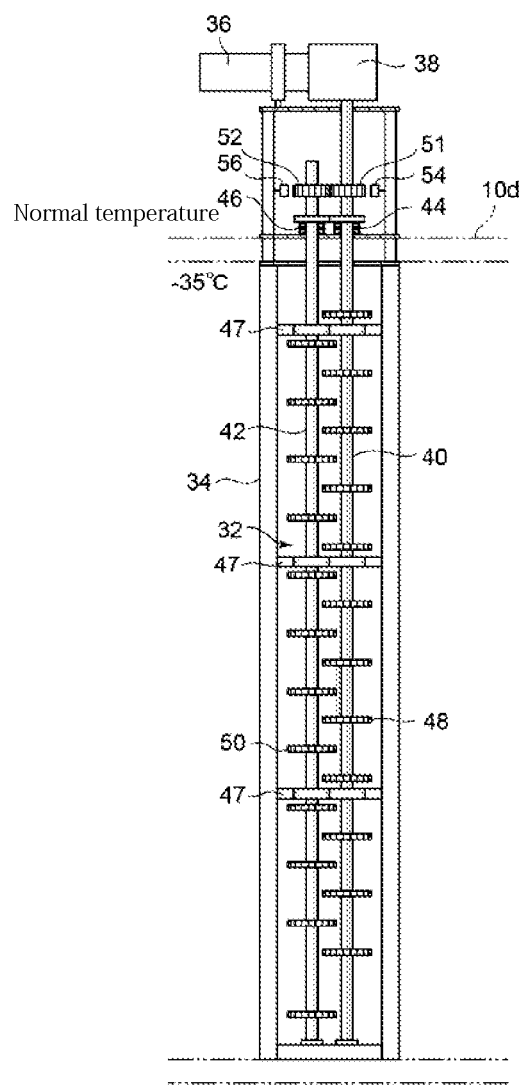
FIG. 4 is a sectional view of a conveyance mechanism of the conveyor device.

In FIG. 4, an upper portion of the housing 34 is disposed through a ceiling wall 10d of the freezer 10 to protrude outside from the freezer 10. A drive motor 36 and a decelerator 38 are disposed on a top surface of the housing 34. Two rotational axes 40 and 42 are disposed in parallel in the vertical direction in the housing 34. Upper ends of the rotational axes 40 and 42 protrude to reach a normal temperature area outside the freezer 10 and are supported by thrust bearings 44 and 46 supported on the ceiling wall 10d in. The rotational axes 40 and 42 have a position in the horizontal direction fixed by a plurality of intermediate bearings 47 arranged in the vertical direction and fixed to the housing 34. A plurality of sprockets 48 and 50 are respectively attached to the rotational axes 40 and 42 at positions corresponding to heights of the inlet path 14A, the spiral ascending path 14B, the spiral descending path 14D, the outlet path 14E, and the return path 14F. By disposing the thrust bearings 44 and 46 in the normal temperature area outside the freezer 10, much longer service lives of the thrust bearings 44 and 46 can be achieved.

Each of the sprockets 48 and 50 meshes with tooth-shaped portions 72d (refer to FIG. 6) of a coupling members 62 later-described coupling members 62 forming the conveyor belt, and moves the conveyor belt forming the endless conveyor path 14 in a conveyance direction. Spur gears 51 and 52 are fixed to upper edge portions of the rotational axes 40 and 42. Teeth counting sensors 54 and 56 which counts the number of teeth of the spur gears 51 and 52 passing through are disposed on inner surfaces facing the spur gears 51 and 52. The rotational axes 40 and 42 are rotated in opposite directions by the drive motor 36 with the spur gears 51 and 52 meshing each other. The sprocket 48 meshes with tooth-shaped portions 72d disposed in the inlet path 14A and the spiral ascending path 14B. The sprocket 50 meshes with the tooth-shaped portions 72d disposed in the spiral descending path 14D and the return path 14F. The inlet path 14A and the return path 14F, as well as the spiral ascending path 14B and the spiral descending path 14D move in opposite directions.

Tension adjustment devices 58, each including a torque motor 58a and a sprocket 58b driven by the torque motor 58a, are disposed at outlet ends of the turning back path 14C and the outlet path 14E. The tension adjustment devices 58 each rotate the sprocket 58b at a speed slightly faster than the movement speed of the endless conveyor path 14, whereby the slackening of the endless conveyor path 14 at the installed portions can be fixed.

Figure 5:
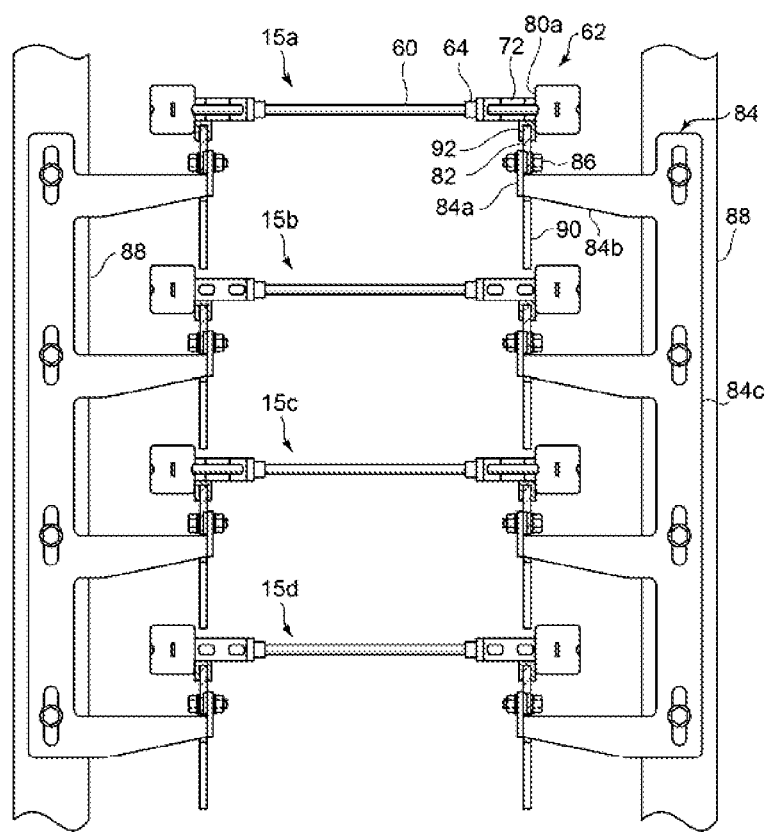
FIG. 5 is a lateral cross-sectional view showing a part of a conveyance path of the conveyor device.
Figure 6:
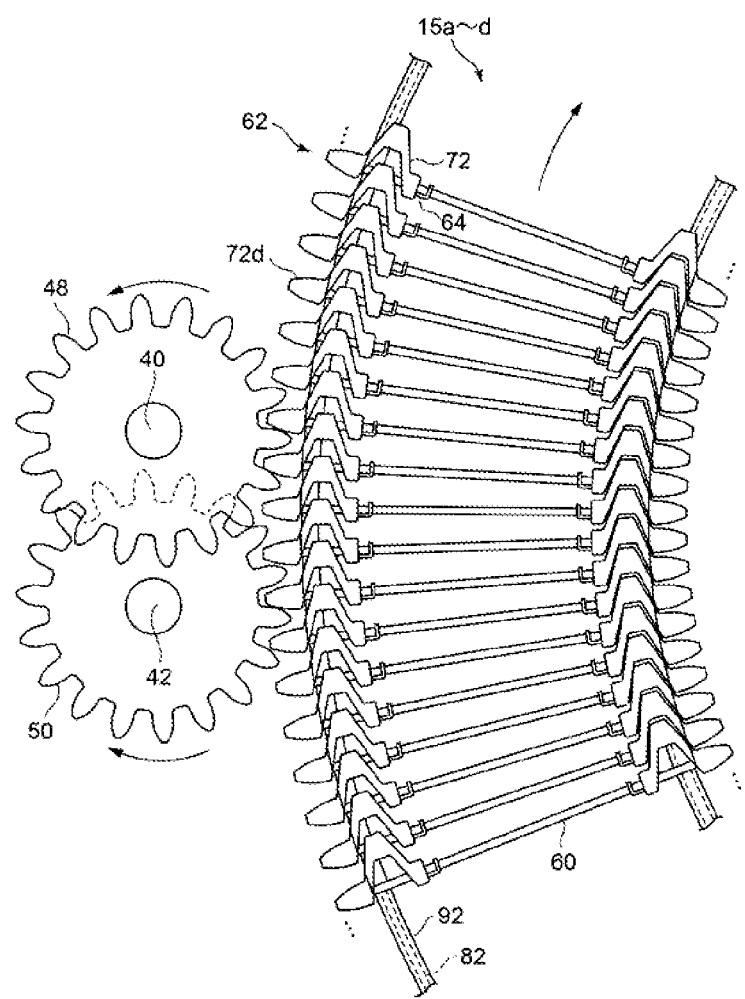
FIG. 6 is a plan view of the conveyance path.
Figure 7:
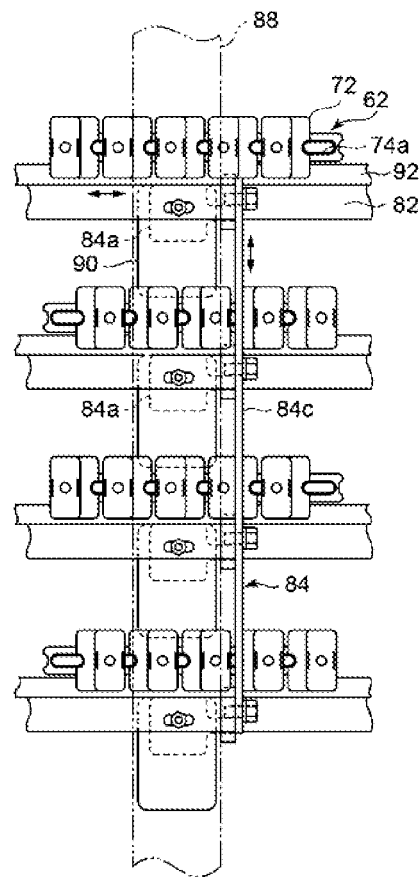
FIG. 7 is a side view of the conveyance path.

FIG. 5 to FIG. 7 each show a part of the spiral ascending path 14B and the spiral descending path 14D and show spiral conveyor belts 15a, 15b, 15c and 15d disposed spirally in the vertical direction. As shown in FIG. 6, the spiral conveyor belts 15a to 15d include a large number of round bars 60 disposed in a horizontal direction. Both ends of the individual round bars 60 are provided with the coupling members 62, the round bars 60 are coupled to each other through the coupling members 62 to be arranged at a predetermined interval.

Figure 8:
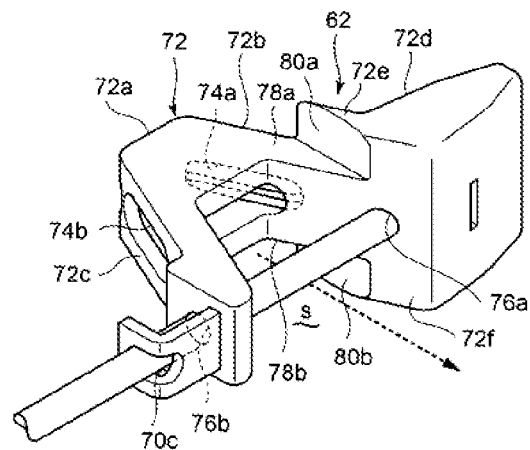
FIG. 8 is a perspective view showing coupling members of the conveyor device.
Figure 9:
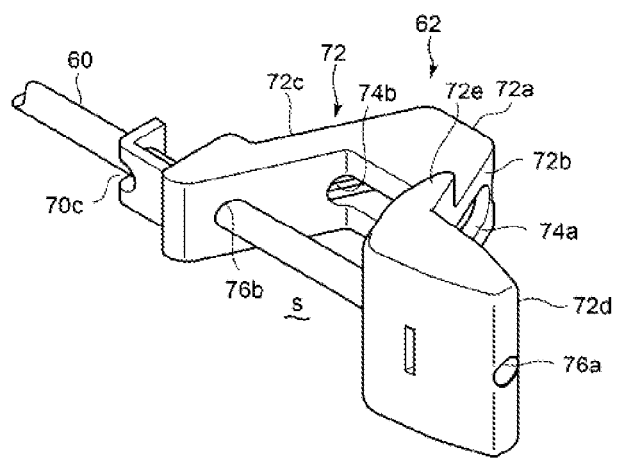
FIG. 9 is a perspective view of the coupling members in a different direction.
Figure 10:
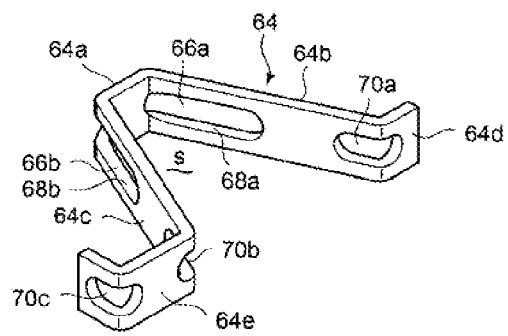
FIG. 10 is a perspective view of an insert member of the coupling members.

FIG. 8 to FIG. 10 are enlarged views of the coupling members 62. The coupling member 62 includes an insert member 64 and a wear resistant resin member 72 incorporating the insert member 64. As shown in FIG. 10, the insert member 64 is formed by bending a strip shaped stainless steel plate with an interior space "s", and is processed to have a shape such that a width of the coupling member gradually increases from a top portion 64a toward both end portions to have a wedge shape. The insert member 64 has the top portion 64a having a flat shape, inclined portions 64b and 64c formed on both sides of the top portion 64a, a bottom portion 64d which continues to the inclined portion 64b, and a bottom portion 64e which continues to the inclined portion 64c. Thus, inner side surfaces forming an interior space "s" gradually widening from the center portion to the both end portions are formed.

Slotted holes 66a and 66b which face each other are formed at portions of the inclined portion 64b and 64c close to the top portion 64a. Holes 70a, 70b and 70c are formed in the bottom portions 64d and 64e. Long sides 68a and 68b of the slotted holes 66a and 66b is in the conveyance direction, and the holes 70a, 70b and 70c are arranged on a straight line to be capable of receiving a single round bar 60.

The wear resistant resin member 72 shown in FIG. 8 and FIG. 9 is made by injection molding using an injection molding machine, to have a shape for covering the insert member 64. Thus, a main body portion of the wear resistant resin member 72 has a shape in which inner side surfaces gradually widens so that the interior space "s" widens from a top portion 72a toward both end portions, as in the case of the insert member 64.

Examples of the material of the wear resistant resin member 72 include, as described above, what is known as engineering plastic such as ultrahigh molecular polycarbonate (PC), polyamide (PA), and polyether ether ketone (PEEK), fluorocarbon resin such as Teflon (registered trademark), nylon resin, or the like.

The wear resistant resin member 72 includes the top portion 72a having a flat shape, inclined portions 72b and 72c formed on both sides of the top portion 72a, a tooth-shaped portion 72d integrally formed with an end portion of the inclined portion 72b, and guide portions 72e and 72f formed between the inclined portion 72b and the tooth-shaped portion 72d. The tooth-shaped portions 72d are disposed on an outer side of the spiral conveyor belt 15a to 15d. Slotted holes 74a and 74b having the same shapes as the slotted holes 66a and 66b are formed at portions of the inclined portions 72b and 72c overlapping the slotted holes 66a and 66b of the insert member 64.

Round holes 76a and 76b are formed at positions of the insert member 64 overlapping the holes 70a and 70b. A single round bar 60 is tightly fitted in the round holes 76a, 76b and 70c. The round bar 60, adjacent to the aforementioned round bars 60, is inserted in the slotted holes 66a and 66b. This round bar 60 can move in the direction of the long sides 68a and 68b in the slotted holes 66a and 66b.

Thus, two adjacent round bars 60 are restricted in a single coupling member 62, and can be relatively displaced in the conveyance direction of the conveyor belt.

Slide surfaces 78a and 78b, in slidable contact with a guide rail 82 formed along the endless conveyor path 14, are respectively formed on upper and lower surfaces of the inclined portion 72b. Guide surfaces 80a and 80b, in slidable contact with a side surface of the guide rail 82, are formed in the vertical direction at the guide portions 72e and 72f. The tooth-shaped portions 72d mesh with the sprockets 48 and 50 and move the conveyor belts 15a to 15d.

The slide surface 78a and the slide surface 78b are disposed to be vertically symmetrical with respect to the round bar 60. The guide surface 80a and the guide surface 80b are disposed to be vertically symmetrical with respect to the round bar 60. Thus, in the endless conveyor path 14, excluding the return path 14F, the coupling members 62 are slidably supported by the guide rail 82 via the slide surfaces 78b, and are guided by the guide rail 82 via the guide surfaces 80b. In the return path 14F, where the conveyor belt is reversed, the coupling members 62 are slidably supported by the guide rail 82 via the slide surfaces 78a, and are guided by the guide rail 82 via the guide surfaces 80a. Thus, the coupling members 62 are guided by the guide rail 82 over the entire arc of the endless conveyor path 14 including the return path 14F.

The guide rail 82 is disposed over substantially the entire area of the endless conveyor path 14, except for a certain portion (for example, an area where the tension adjustment mechanism 20 including the guide sprockets 22 and 22 and the tension roller 24 is disposed). The slide surfaces 78a and 78b form flat surfaces in the horizontal direction and are in slidable contact with the upper edge surface of the guide rail 82, except for the return path 14F, to slide on the guide rail 82. In the return path 14F, where the conveyor belt is reversed to be upside down, the slide surface 78a is in slidable contact with the upper edge surface of the guide rail 82. The side surface of the guide rail 82 is in slidable contact with the guide surfaces 80a and 80b of the guide portions 72e and 72f. Thus, the guide portion 72e and 72f can prevent the spiral conveyor belts 15a to 15d from falling off the guide rail 82. An arrow in FIG. 8 indicates a movement direction of the guide rail 82 with respect to the movement of the coupling member 62.

As shown in FIG. 5 and FIG. 7, the guide rail 82 is made of metal such as stainless steel and is disposed below the slide surface 78b of the coupling members 62. The spiral conveyor belt 15a to 15d are supported by the guide rail 86 in such a manner as to be movable in the conveyance direction. The guide rail 82 is fixed to supporting structures 84 disposed on both sides of the spiral conveyor belt 15a to 15d. Each of the supporting structures 84 is made of metal such as stainless steel, and includes: a support plate 84a coupled with bolts 86 to the guide rail 82; four arms 84b which is integrally formed with the support plate 84a and extends in a direction orthogonal to the support plate 84a; and a base portion 84c in which the arms 84b are integrally formed and disposed at an equal interval in the vertical direction.

Columns 88 stand on both sides of the spiral conveyor belt 15a to 15d while being apart from each other by an appropriate interval. The base portion 84c of the supporting structure 84 is bolted to the corresponding column 88. An anti-drop plate 90 is coupled to guide rail 82 together with the support plate 84a, with a bolt 86. The anti-drop plate 90 is disposed right below the guide rail 82, and is partially disposed in the conveyance direction instead of being disposed over the entire are of the guide rail 82, whereby flow of cold air between an upper space of the conveyor belt and an exterior space thereof is ensured. The anti-drop plate 90 is suspended from an inner side of the guide surface 80a of the coupling member 62 of the conveyor belt disposed on a lower side, and prevents the food on the conveyor belt from falling to the outer side of the conveyor belt. The anti-drop plate 90 guides the guide portion 72e of the coupling member 62 on the lower side from the inner side, and thus has a function of preventing the conveyor belt on the lower side from falling off.

The guide rail 82 and the support plate 84a, the base portion 84c and the columns 88, and the support plate 84a and the anti-drop plate 90 are bolted to each other through the slotted holes. Thus, the relative positions therebetween can be slightly adjusted in the horizontal direction or the vertical direction. The upper edge of the guide rail 82 in slidable contact with the slide surfaces 78a, 78b is covered with a U-shaped cover 92 made of the above-described wear resistant resin.

Figure 11:
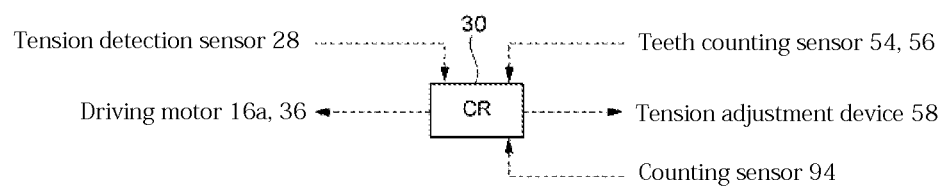
FIG. 11 is a block line diagram showing a control system for the conveyor device.

As shown in FIG. 1, a counting sensor 94 which measures the number of tooth-shaped portions 72d of the coupling members 62 passing through is disposed on a lower side of the inlet path 14A. FIG. 11 illustrates a control system for the conveyor device 12. Detection values from the tension detection sensor 28, the teeth counting sensors 54 and 56, and the counting sensor 94 are input to the control device 30. The control device 30 controls operations of the drive motor 16a, the drive motor 36, the tension adjustment devices 58, and the like based on these detection values.

In this configuration, an extremely low temperature atmosphere at −35° C. or the like for example is maintained in the freezer 10. In the conveyor device 12, the food is placed on the conveyor belt and is frozen while being conveyed in the extremely low temperature atmosphere. The round bars 60 are either tightly fitted in the round holes 70a to 70c of one of the adjacent coupling members 62 or loosely fitted in the slotted holes 66a and 66b of the other one of the adjacent coupling members 62. Thus, the round bars are arranged in parallel to form the conveyance path, while having the interval therebetween restricted with the coupling members 62. On the other hand, the coupling members are coupled to each other in series in the conveyance direction by the round bars 60. The round bar 60 inserted in the slotted holes 66a and 66b can move in the conveyance direction, whereby the interval between the round bars 60 can be adjusted.

The detection value from the tension detection sensor 28 is input to the control device 30. Thus, the control device 30 controls operations of the drive motor 16a and the tension adjustment devices 58 in such a manner that the tension of the conveyor belt forming the endless conveyor path 14 is prevented from being an abnormal value. The detection values from the teeth counting sensors 54 and 56 and the counting sensor 94 are input to the control device 30. Thus, the control device 30 monitors a moving state of the endless conveyor path 14.

According to the present exemplary embodiment, the coupling members 62 includes the wear resistant resin member 72 incorporating the insert member 64 made of the stainless steel. Thus, higher restricting force for the round bars 60 and lighter weight can be both achieved. The tooth-shaped portions 72d mesh with the sprockets 48 and 50 and move the conveyor belts 15a to 15d. The slide surfaces 78a and 78b, the guide surfaces 80a and 80b, the tooth-shaped portions 72d, and the sprockets 48 and 50 are all made of the wear resistant resin, whereby the wearing and production of the abrasion power can be prevented. All things considered, a favorable hygienic environment for the conveyed food can be maintained.

A single round bar 60 is supported by both end portions of a single coupling member 62, whereby the coupling member 62 can have high rigidity for supporting the round bar 60. Portions, where the slotted holes 74a and 74b and the holes 76a and 76b into which the round bar 60 is inserted, need to have high rigidity. The portions include the insert member 64 and the wear resistant resin member 72 and thus can have high rigidity. The round bar 60 is tightly fitted in the holes 70a to 70c of the insert member 64, whereby the coupling member 62 can be strongly attached to the round bar 60.

The slide surface for the guide rail 82 includes the slide surfaces 78a and 78b and the guide surfaces 80a and 80b only. Thus, the configuration of surrounding the guide rail 82 as in Patent Document 3 is not employed. Thus, the slackening of the conveyor belt can be easily fixed. The contact pressure and the friction force between the coupling member 62 and the guide rail 82 do not increase in the low temperature environment. Thus, the driving torque of the conveyance mechanism 32 can be prevented from increasing, and abrasion powder can be prevented from being produced on the slide surface on the guide rail 86. All things considered, the quality of the food on the conveyor belt can be prevented from being adversely affected. When the contact pressure and the friction force on the slide surface increase, knocking phenomenon involving unstable conveyance speed of the conveyor belt due to periodical change of the contact pressure and the friction force occurs. Thus, the smooth movement of the endless conveyor path 14 is hindered. In the present embodiment, the contact pressure and the friction force do not increase on the slide surface, whereby the knocking phenomenon can be prevented from occurring.

The coupling member 62 has the slide surfaces 78a and 78b and the guide surfaces 80a and 80b on upper and lower surfaces. Thus, the guide rail 82 can support the endless conveyor path 14 in the return path 14F, whereby the conveyor belt can be prevented from falling off the guide rail 82. Thus, the endless conveyor path 14 can smoothly move.

The coupling member 62 is provided for each round bar 60, whereby the adjacent coupling members 62 are free of restriction. Thus, an intricate curved line shape can be formed at the curved portion of the endless conveyor path 14, and thus higher design freedom of the endless conveyor path 14 can be achieved. Furthermore, the guide rail 82 can have a simple shape, and can be manufactured at a low cost.

The tension detection sensor 28 constantly monitors the tension applied to the endless conveyor path 14, and the control device 30 operates the drive motor 16a of the guide sprocket 16, whereby the tension can be adjusted. As described above, the slackening of the endless conveyor path 14 can be adjusted, and thus excessively high tension can be prevented from being applied to the endless conveyor path 14. The teeth counting sensors 54 and 56 and the counting sensor 94 can constantly monitor the moving state of the endless conveyor path 14, whereby abnormality of the conveyor device 12 can be quickly detected.

The conveyance mechanism 32 can apply conveyance force evenly on the spiral ascending path 14B and the spiral descending path 14D with the plurality of sprockets 48 and 50 fixed to the rotational axes 40 and 42. Thus, the endless conveyor path 14 can uniformly move, whereby the slackening can be prevented from occurring. The conveyance mechanism 32 only requires a single drive motor 36, whereby the simple and low cost configuration can be achieved.

The anti-drop plate 90 can prevent the food on the conveyance belt from falling off the conveyance path. The guide portions 72e and 72f provided to the anti-drop plate 90 and the coupling member 62 can prevent the conveyor belt from falling off the guide rail 82. The guide rail 82 is supported by the columns 88, standing on both sides of the conveyor belt while being apart from each other by an appropriate interval, and the supporting structure 84. Thus, the guide rail 82 can be fixed by a simple and low cost supporting structure, even when the conveyor belt has multiple stages in the vertical direction.

As shown in FIG. 4, the drive motor 36, the decelerator 38, the thrust bearings 44 and 46, the spur gears 51 and 52, and the teeth counting sensors 54 and 56 are disposed in the normal temperature area on the outer side of the ceiling wall 10d, and thus can be maintained and repaired easily.

(Embodiment 2)

Next, a second embodiment of the present invention will be described with reference to FIG. 12 to FIG. 18. The present embodiment represents an example where coupling members having a configuration different from the coupling members 62 in the first embodiment are used. Coupling members 100 according to the present embodiment each include an insert member 102 made of stainless steel and a wear resistant resin member 110 incorporating the insert member 102.

Figure 17:
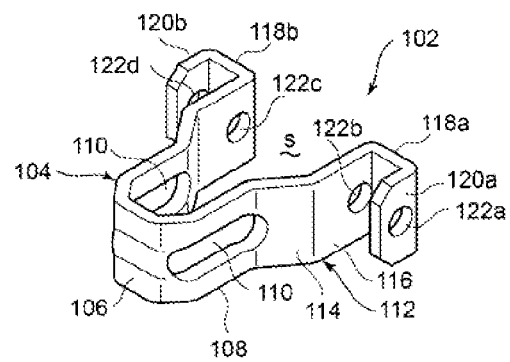
FIG. 17 is a perspective of an insert member of the coupling members shown in FIG. 15.

As shown in FIG. 17, the insert member 102 is formed by bending a strip shaped stainless steel plate bent in half with an interior space "s". The insert member 102 includes a top portion 104 and both end side portions 112 as portions other than the top portion 104. The top portion 104 includes a flat top surface 106 and parallel wall portions 108 including two walls parallel to each other. In the parallel wall portions 108, a pair of slotted holes 110 and 110 are formed at positions facing each other.

The both end side portions 112 include inclined wall portions 114 including two inclined walls inclined in directions to increase the width, parallel wall portions 116 including two walls which continue to the inclined wall portions 114 and are parallel to each other, flat bottom portions 118a and 118b which continue to the parallel wall portions 116, and folded back portions 120a and 120b which continues to the bottom portions 118a and 118b and are folded back toward the top portion 104. Round holes 122a and 122b and round holes 122c and 122d are formed in the parallel wall portions 116 and the folded back portions 120a and 120b. The round holes are arranged on a straight line to be capable of receiving a single round bar 60.

Figure 15:
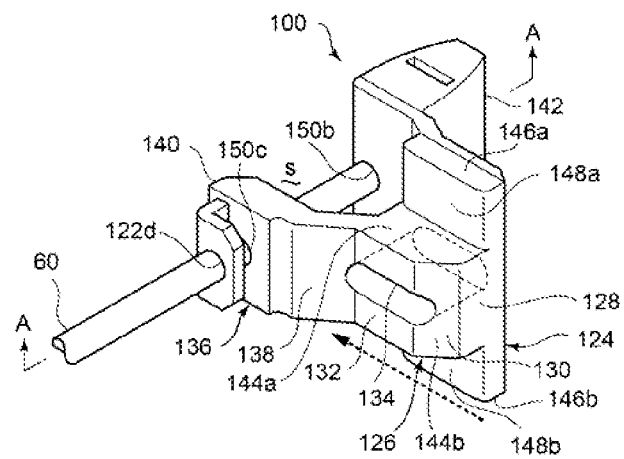
FIG. 15 is a perspective view of coupling members of the conveyor device shown in FIG. 12.
Figure 16:
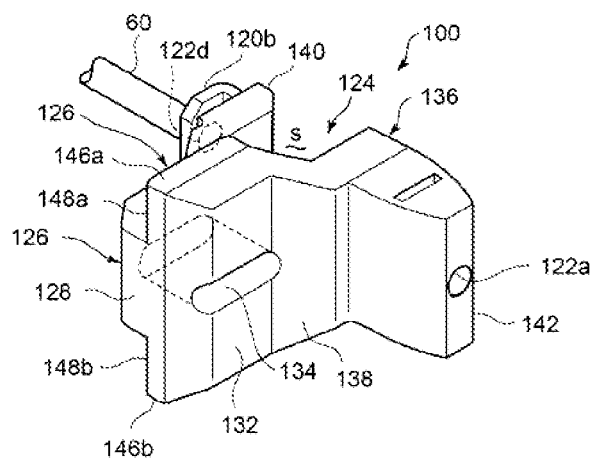
FIG. 16 is a perspective view of the coupling members shown in FIG. 15 in a different direction.

As shown in FIG. 15 and FIG. 16, the wear resistant resin member 124 incorporates the insert member 102. The wear resistant resin member 124 and the wear resistant resin member 72 according to the first embodiment are made of the same material. The wear resistant resin member 124 includes a top portion 126 and both end side portions 136 as portions other than the top portion 126.

The top portion 126 includes a flat top surface 128, inclined surfaces 130, and a first parallel section 132 having parallel outer side surfaces. Slotted holes 134, which are formed through both outer side surfaces and have long sides extending from the top portion 126 to the both end side portions 136, are formed in the first parallel section 132. The slotted holes 134 are formed at positions matching the top portions 110 and 110 of the insert member 102.

The both end side portions 136 includes inclined wall portions 138 including two walls inclined in directions to increase the width, a second parallel section 140 which continues to the inclined wall portions 138 and having a larger width than the first parallel section 132, and tooth-shaped portions 142 integrally formed with the second parallel section 140. The inclined wall portions 138 have inner and outer side surfaces extending to the outer sides. The second parallel section 140 has parallel inner and outer side surfaces. An interior space "s" is formed in the inclined wall portions 138 and the second parallel section 140. The interior space "s" is wide enough to receive the first parallel section 132. The tooth-shaped portions 142 are disposed on the outer side of the conveyor belt including the round bars 60.

Slide surfaces 144a and 144b in slidable contact with the guide rail 82 are formed on upper and lower surfaces of the top portion 126. The slide surfaces 144a and 144b are disposed to be vertically symmetrical with respect to the round bar 60. Guide portions 146a and 146b in the vertical direction are integrally formed with the top portion 126. The guide portions 146a and 146b include guide surfaces 148a and 148b in slidable contact with the side surface of the guide rail 82. The guide surfaces 148a and 148b are disposed to be vertically symmetrical with respect to the round bar 60.

Round holes 150a, 150b and 150c are formed at positions of the wear resistant resin member 124 matching the round holes 122a, 122b, and 122c of the insert member 102, and have the same diameter as the round holes 122a, 122b and 122c. The round bar 60 is tightly fitted in the round holes 122a to 122d of the insert member 102. The round bar 60, adjacent to the aforementioned round bar 60, is loosely fitted in the slotted holes 134 and can move in the directions of the long sides of the slotted holes 134. Thus, the two round bars 60 restricted by a single coupling member 100 can be relatively displaced in the conveyance direction of the conveyor belt.

Figure 18:
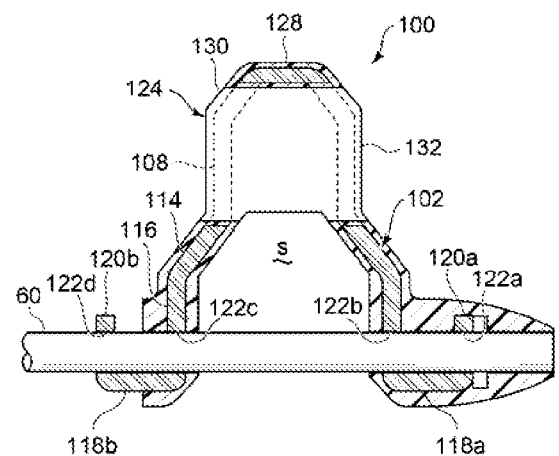
FIG. 18 is a cross-sectional view along line A-A in FIG. 15.

As shown in FIG. 18, the round bar 60 is tightly fitted in the four round holes 122a to 122d formed in the insert member 102. Thus, the coupling member 100 is strongly coupled to the round bar 60 in the axial direction. The bottom portions 118a and 118b are in contact with the round bar 60. Thus, the coupling member 100 is strongly coupled to the round bar 60.

Figure 12:
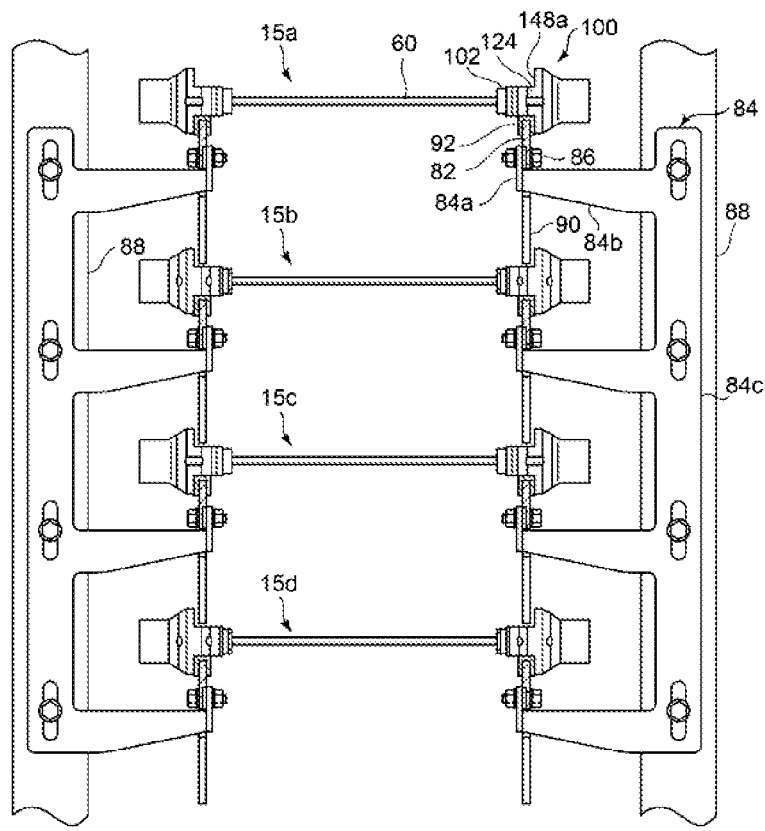
FIG. 12 is a lateral cross-sectional view showing a part of a conveyor device according to a second embodiment of the present invention.
Figure 13:
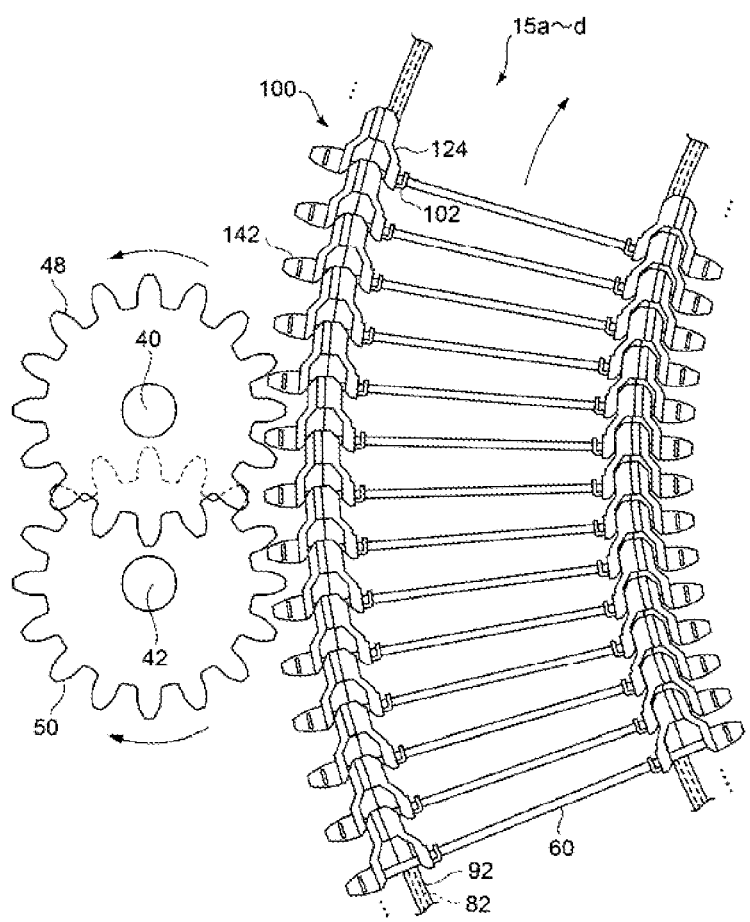
FIG. 13 is a plan view of the conveyance path shown in FIG. 12.
Figure 14:
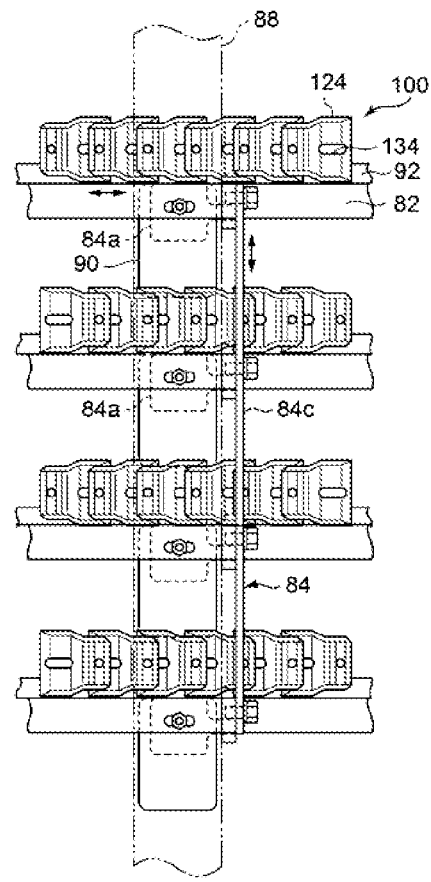
FIG. 14 is a side view of the conveyance path shown in FIG. 12.

As shown in FIG. 12 to FIG. 14, the tooth-shaped portions 142 mesh with the sprocket 48 or 50, and move the conveyor belts 15a to 15d in the conveyance direction. In the endless conveyor path 14 excluding the return path 14F, the coupling members 100 is slidably supported by the guide rail 82 via the slide surface 144b, and is guided by the guide rail 82 via the guide surface 148b.

In the return path 14F where the conveyor belt is reversed, the coupling member 62 is slidably supported by the guide rail 82 via the slide surface 144a, and is guided by the guide rail 82 via the guide surface 148a. Configurations other than that of the coupling members 100 are the same as the counterparts in the first embodiment.

According to the present exemplary embodiment, the following advantageous effect can be obtained in addition to the advantageous effect obtained by the first embodiment. Specifically, when the top portion 126 of one of the adjacent coupling members 100 enters the interior space s of the other one of the adjacent coupling members 100, no gap in a longitudinal axis direction is formed between the coupling members. Thus, the coupling members restrict one another in the longitudinal axis direction of the round bars 60, whereby a smooth operation of the coupling members in the conveyance direction can be ensured. Thus, the conveyance operation is smoothly performed with the round bars 60 positioned in the longitudinal axis direction. Thus, the conveyance path can be curved easily to have higher design freedom, and the knocking phenomenon involving unstable conveyance speed at conveyance direction positions of the conveyor belt can be prevented.

The insert member 102 are coupled to the coupling members 100 at four positions including the round holes 122b and 122c formed in the second parallel section 140 and the round holes 122a and 122d formed in the folded back portions 120a and 120b. Thus, the round bar 60 and the coupling member 10 can be strongly coupled to each other. The bottom portions 118a and 118b are in contact with the round bar 60, whereby the coupling members 100 can be strongly coupled to the round bars 60.

(Third Embodiment)

Figure 19:
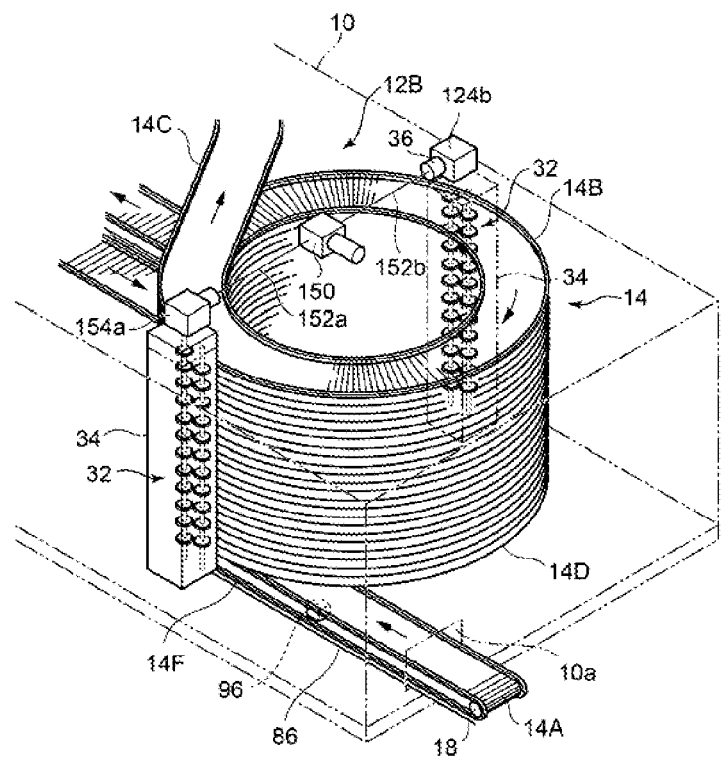
FIG. 19 is a perspective view of an entire conveyor device according to a third embodiment of the present invention.

Next, a conveyor device according to a third embodiment of the present invention will be described with reference to FIG. 19. A conveyor device 12B according to the present embodiment represents an example of a case where a load of the conveyance mechanism 32 is large. In the present embodiment, a drive motor 150 is disposed at the center of an upper edge portion of the spiral conveyance path including the spiral ascending path 14B and the spiral descending path 14D. The drive motor 150 has a larger capacity than the drive motor 36 according to the first embodiment. Two housings 34 are disposed at positions on opposite sides of the spiral conveyance path, and each housing 34 incorporates the conveyance mechanism 32 having the configuration that is the same as that in the first embodiment.

Gearboxes 154a and 154b which drive the rotational axes 40 and 42 are disposed on top walls of the housings 34. Driving shafts 152a and 152b extend from the drive motor 150 to be connected to the gearboxes 154a and 154b. Other configurations are the same as the counterparts in the first embodiment.

In the present embodiment, the driving force from the drive motor 150 is transmitted to the rotational axes 40 and 42 in the conveyance mechanisms 32 through the gearboxes 154a and 154b. In the present embodiment, even when the load of the conveyance mechanism 32 is large, the two conveyance mechanisms 32 can be driven by a single drive motor 150. The conveyance force is shared by the two conveyance mechanisms 32 on both sides of the spiral conveyance path, whereby the smooth movement of the spiral conveyance path can be achieved.

(Fourth Embodiment)

Figure 20:
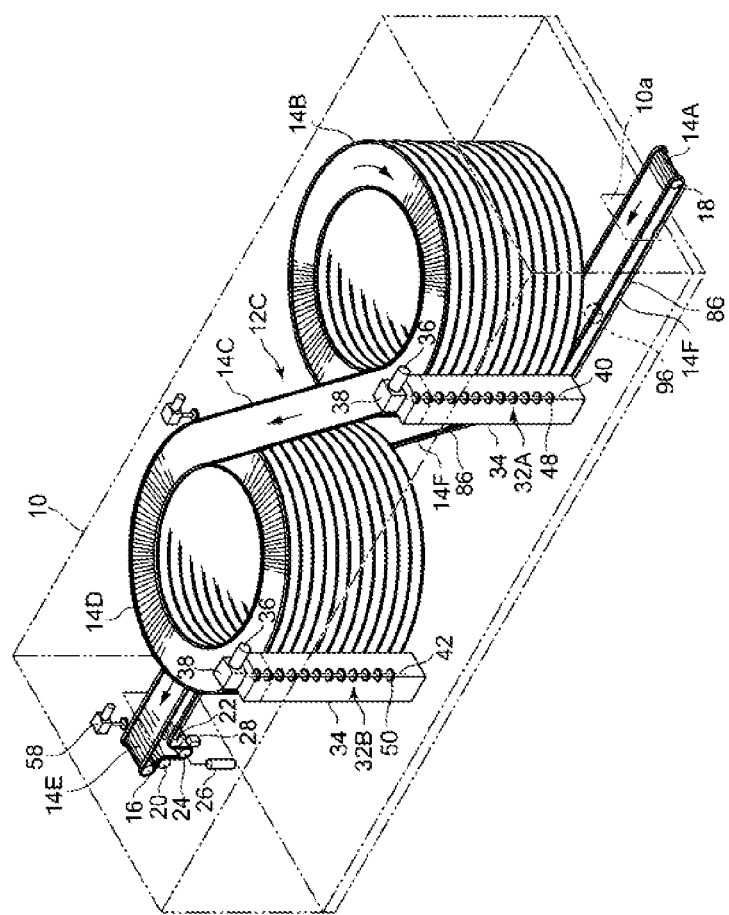
FIG. 20 is a perspective view of an entire conveyor device according to a fourth embodiment of the present invention.
Figure 21:
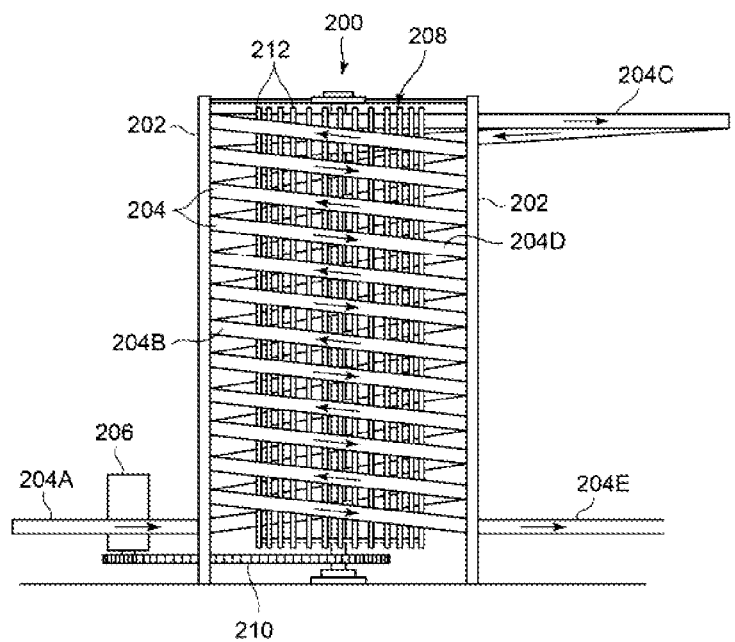
FIG. 21 is a front view of an entire a conventional spiral endless conveyor device.

Next, a fourth embodiment of the present invention will be described with reference to FIG. 20. In a conveyor device 12C according to the present embodiment, two spiral conveyance paths each including corresponding to one of the spiral ascending path 14B and the spiral descending path 14D are adjacently disposed in the freezer 10. The housing 34 is provided to each of the two spiral conveyance paths. A conveyance mechanism 32A is disposed in one of the housings 34, and a conveyance mechanism 32B is disposed in the other one of the housings 34. The conveyance mechanism 32A includes only one rotational axis 40 to which the plurality of sprockets 48 according to the first embodiment shown in FIG. 4 are attached. The conveyance mechanism 32B includes only one rotational axis 42 to which the plurality of sprockets 50 according to the first embodiment shown in FIG. 4 are attached.

Teeth counting sensors having the configurations that are the same as those of the teeth counting sensors 54, 56 according to the first embodiment shown in FIG. 4 are provided to the conveyance mechanisms 32A and 32B, and detect rotation amounts of the rotational axes 40 and 42. Furthermore, a control device similar to the control device 30 shown in FIG. 11 is provided. The control device has a function of synchronizing the rotation speeds of the rotational axes 40 and 42 to synchronize the movement speeds of the conveyor belt forming the spiral ascending path 14B and the conveyor belt forming the spiral descending path 14D by receiving detection values from the teeth counting sensors provided to the conveyance mechanisms 32A and 32B. The other configurations are the same as the counterparts in the first embodiment.

According to the present embodiment, the spiral ascending path 14B and the spiral descending path 14D are separated from each other, and thus the spiral conveyance path having a simpler and lower cost configuration, compared with the third embodiment, can be achieved. The conveyance mechanisms 32A and 32B are different from the conveyance mechanism 32 according to the first embodiment in that only one rotational axis is provided and can each be configured for a spiral conveyance path moving in a single direction. Thus, a simple and low cost configuration can be achieved. The movement speeds of the conveyor belt forming the spiral ascending path 14B and the conveyor belt forming the spiral descending path 14D are synchronized. Thus, the conveyor belt forming the endless conveyor path 14 can be prevented from slackening and can move smoothly.

INDUSTRIAL APPLICABILITY

With the present invention, metal powder can be prevented from being produced and the quality of food can be prevented from degrading in processing such as heating, drying, and freezing for the food. Furthermore, a simple and low cost conveyor device can be implemented in which contact pressure and friction between the guide rail and the conveyor belt component can be prevented from increasing in a low or high temperature environment.

The invention claimed is:

1. A conveyor device for conveying food which processes food while conveying the food with a spiral conveyor belt disposed in a vertical direction in a closed space, the conveyor device comprising:
   bar members which are arranged in parallel to form the conveyor belt;
   coupling members which are fixed to both ends of each of the bar members and couple the bar members with each other;
   a guide rail which slidably supports the conveyor belt including the bar members; and
   a sprocket which meshes with tooth-shaped portions formed on the coupling members, wherein
   each of the coupling members includes a metallic insert member and a wear resistant resin member incorporating the metallic insert member, has a bent shape with an interior space, has both end portions coupled to a first bar member, and has a pair of slotted holes in which a second bar member which is adjacent to the first bar member is loosely fitted,
   each wear resistant resin member forms the tooth-shaped portion as well as a pair of slide surfaces disposed to be vertically symmetrical with respect to the bar members such that one of the pair of the slide surfaces slides on the guide rail, and a meshing portion of the sprocket which meshes with the tooth-shaped portions is formed of a wear resistant resin.

2. The conveyor device for conveying food according to claim 1, wherein
each metallic insert member includes a strip-shaped metal plate having a bent shape with an interior space,
first and second holes in which the first bar member is tightly fitted are respectively formed at both end portions of the metallic insert member, and
a pair of slotted holes in which the second bar member is loosely fitted are formed from the both end portions toward a top portion of the metallic insert member.

3. The conveyor device for conveying food according to claim 1, wherein the tooth-shaped portions are each formed on one of the both end portions of each coupling member so as to face outward from the conveyor belt including the bar members.

4. The conveyor device for conveying food according to claim 1, wherein
each wear resistant resin member includes a guide portion protruding toward the guide rail on an outer side of each of the slide surfaces,
each guide portion includes a guide surface which is configured to be in slidable contact with a side surface of the guide rail, and
the guide surface is provided as a pair of guide surfaces disposed to be vertically symmetrical with respect to the bar members such that one of the pair of the guide surfaces is in contact with the side surface of the guide rail.

5. The conveyor device for conveying food according to claim 4, wherein
an upper edge of the guide rail is covered with a cover made of a wear resistant resin, and
the cover made of the wear resistant resin is in slidable contact with the slide surfaces and the guide surfaces.

6. The conveyor device for conveying food according to claim 1, wherein
each coupling member has a shape such that a width of the coupling member gradually increases from the both end portions toward the top portion to have a wedge shape, and
the top portion of each coupling member is configured to be capable of entering the interior space of adjacent one of the coupling members.

7. The conveyor device for conveying food according to claim 1, wherein
each coupling member includes:
a first parallel section disposed at the top portion, the first parallel section having parallel outer surfaces; and
a second parallel section disposed on a portion including the both end portions and excluding the top portion, the second parallel section having parallel outer surfaces and a width larger than that of the first parallel section, and
the second parallel section has parallel inner surfaces and forms the interior space into which the first parallel section is able to enter.

8. The conveyor device for conveying food according to claim 2, wherein
each metallic insert member includes a turning back portion disposed on at least one of the both end portions, the turning back portion turning back from an outer side of the at least one of the both end portions toward the top portion, and
the turning back portion includes a third hole in which the first bar member is tightly fitted.

9. The conveyor device for conveying food according to claim 1, wherein
the spiral conveyor belt includes an endless conveyor belt including a return path in which the spiral conveyor belt is reversed at a terminating end portion of the spiral conveyor belt to return to a starting end portion of the spiral conveyor belt,
the guide rail is disposed over an entire length of the endless conveyor belt, and
the conveyor device includes:
a tension adjustment mechanism which is disposed in a path of the endless conveyor belt and adjusts tension of the endless conveyor belt; and
a conveyance mechanism including the sprocket and a driving device for the sprocket.

10. The conveyor device for conveying food according to claim 9, wherein
the endless conveyor belt includes:
an inlet path which is disposed in a horizontal direction;
a spiral ascending path which has a lower end portion coupled to the inlet path and spirally ascends towards a downstream side in a conveyance direction;
a turning back path turning back from an upper most portion of the spiral ascending path;
a spiral descending path coupled to the turning back path and disposed so that stages of the spiral ascending path and stages of the spiral descending path are arranged alternately, the spiral descending path spirally descending;
an outlet path which is coupled to a lower most portion of the spiral descending path and is disposed in the horizontal direction; and
the return path which turns back at an end of the outlet path toward a lower part of the outlet path and continues to an end of the inlet path.

* * * * *